Aug. 30, 1955  J. W. RAWLINGS  2,716,433
WEATHER PROTECTIVE COVERING FOR AUTOMOBILE BODIES
Filed May 8, 1953  2 Sheets-Sheet 1
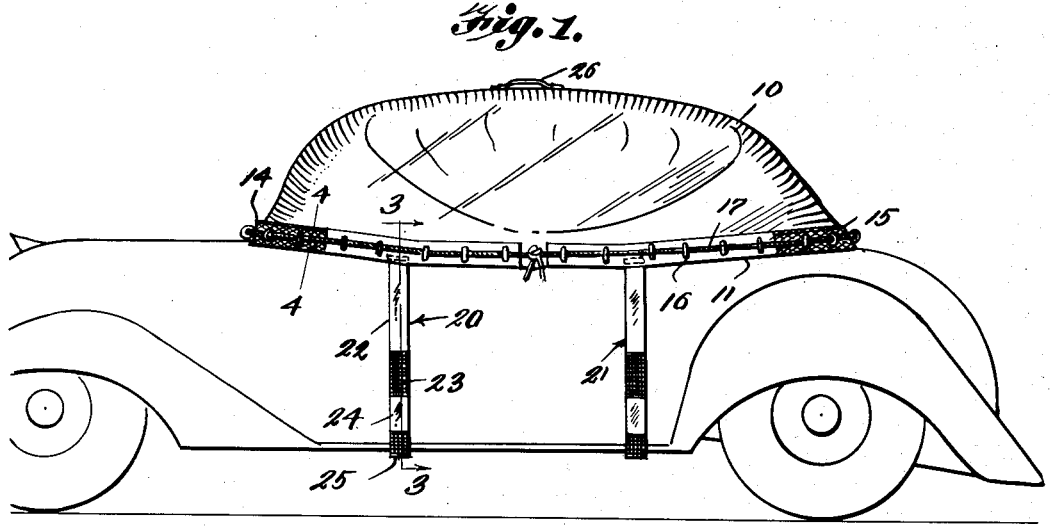
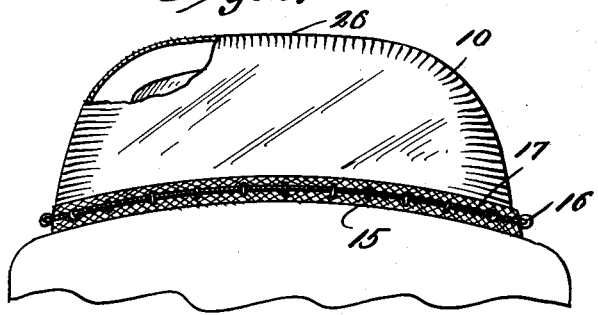
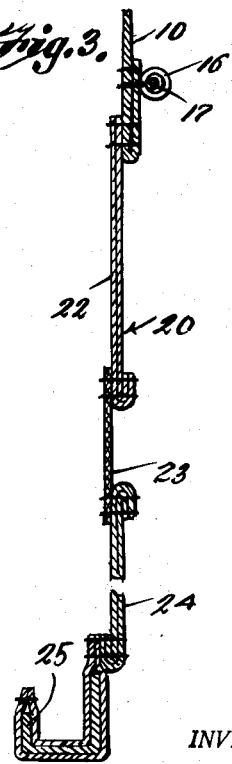
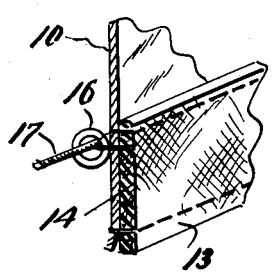
INVENTOR.
JAMES W. RAWLINGS
BY
Patrick D. Beavers
ATTORNEY Aug. 30, 1955 J. W. RAWLINGS 2,716,433
WEATHER PROTECTIVE COVERING FOR AUTOMOBILE BODIES
Filed May 8, 1953 2 Sheets-Sheet 2
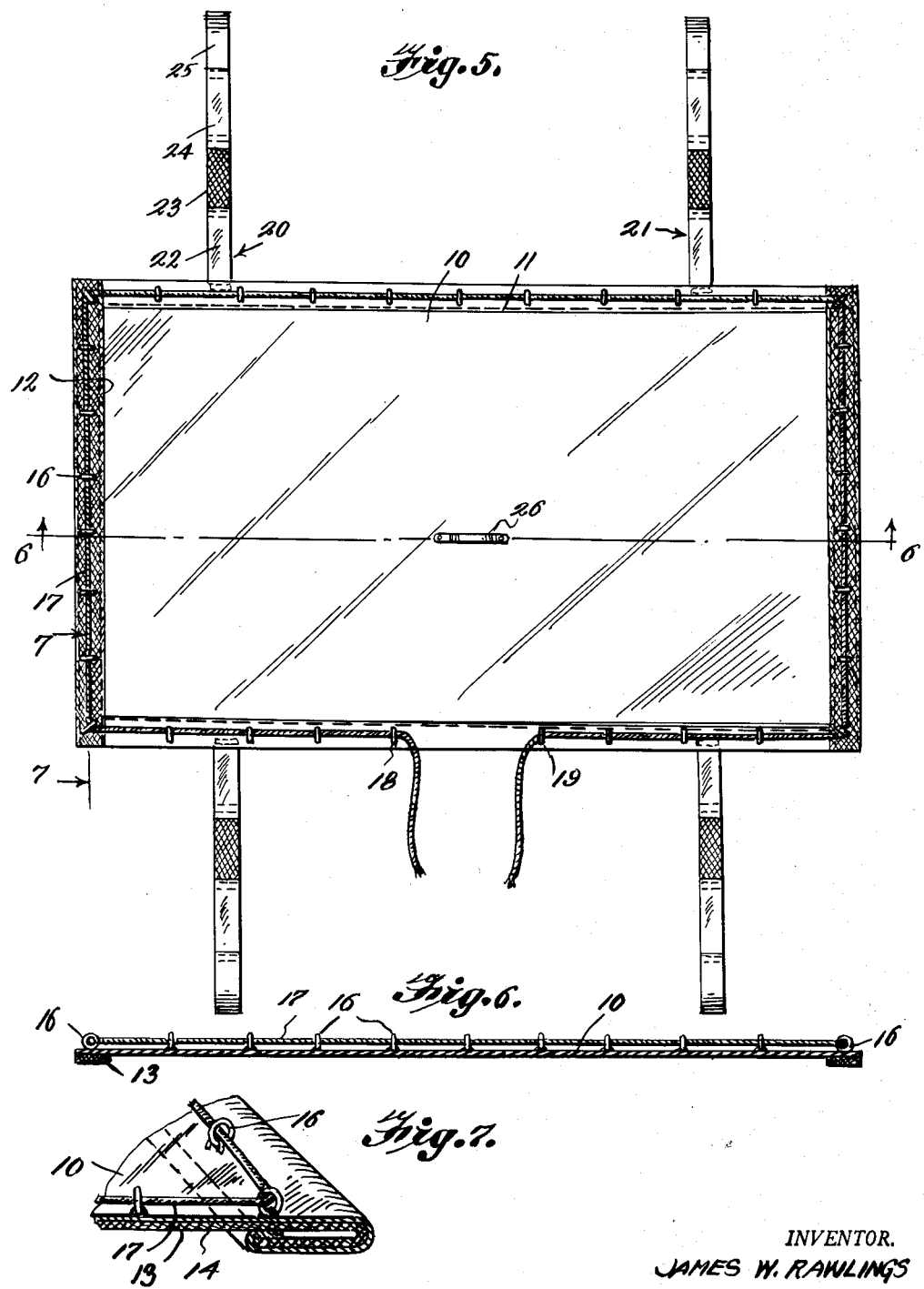
INVENTOR.
JAMES W. RAWLINGS
BY
Patrick D Beavers
ATTORNEY

United States Patent Office 2,716,433
Patented Aug. 30, 1955

2,716,433

WEATHER PROTECTIVE COVERING FOR AUTOMOBILE BODIES

James W. Rawlings, Norfolk, Va.

Application May 8, 1953, Serial No. 353,816

1 Claim. (Cl. 150—52)

This invention relates to improvements in body coverings for automobiles and other vehicles whereby the windows of the vehicle are protected against snow, freezing and other inclement weather, particularly during the winter months.

The principal object of the present invention is to provide a flexible covering for disposition over the upper most part of an automobile body to cover the windshield, side windows and rear window, on occasions when the vehicle must be left outdoors, with the result that if inclement weather occurs during the night or after the covering has been placed, the windows will be protected against the accumulation of snow and ice, and of course the covering will serve as a protector against other foreign matter such as dust and the accumulation of insects and deposits from birds, particularly in areas where there are trees.

Still another object of the invention is to provide an automobile body covering especially adapted for turret type automobile bodies, to the end that the covering can be easily applied inasmuch as it covers only the turret portion of the vehicle and this, of course, includes the windows which is the main feature to be protected.

A further object of the invention is to provide a body protective covering at a means whereby the same can be quickly and efficiently contracted over that portion of the automobile body to be protected and secured in place against displacement by winds.

Still, a further object of the invention is to provide a protective covering of the character stated which is of simple construction and of inexpensive materials, to the end that the covering can be manufactured and retailed at a low monetary figure.

These and various other objects and advantages of the invention will become apparent to the reader of the following description.

In the drawing:

Figure 1 represents a side elevational view of a vehicle equipped with the protective covering.

Figure 2 is a fragmentary rear elevational view of an automobile showing the covering applied and a portion broken away.

Figure 3 is an enlarged sectional view taken on line 3—3 of Figure 1.

Figure 4 is an enlarged fragmentary perspective view taken on line 4—4 of Figure 1.

Figure 5 is a top plan view of the protective covering in extended position.

Figure 6 is a section taken substantially on line 6—6 of Figure 5.

Figure 7 is an enlarged fragmentary sectional view taken on line 7—7 of Figure 5.

Referring to the drawings wherein like numerals designate like parts, it can be seen that the protective covering includes a substantially rectangular shaped sheet 10 of thin, durable and flexible plastic material, the longitudinal side portions being preferably hemmed as at 11, as are the end portions at 12.

Along the end portions of the sheet 10 are secured, as by stitching 13, tapes 14, 15. This allows for a snug fit of the covering about the windshield and rear window as is suggested in Figure 1.

Along all edges of the sheet 10 at the hems referred to are equi-distantly spaced eyes 16 through which an elongated cord 17 is disposed, the ends of the cord extending through endmost eyes 18, 19 at one longitudinal edge of the sheet 10.

From each longitudinal edge of the sheet 10 extends a pair of flexible retaining arms generally referred to by numerals 20, 21.

Each of these arms 20, 21 consist of a taped section 22 connected to one end of an elastic strip 23, the other end of the elastic strip 23 being connected to a tape section 24 which forms an envelope for a hook 25 which engages down under the bottom edge portion of the automobile body as shown in Figure 1 to prevent rising of the protective covering, after the same has been secured in place by drawing tight the cord 17 and tying the same in a bow knot as shown in Figure 1.

Thus the protective covering is secured snugly about the turret portion of the automobile body and further secured by the flexible arms, 20, 21 on each side of the body against rising of the protective covering under wind conditions.

A strap 26 serving as a handle and hanger is preferably provided at the central portion of the sheet 10 as shown in Figure 5.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

A protective covering for the turret portion of turret type automobiles including front, side and rear windows; a rectangular sheet of flexible waterproof material for disposition over the turret portion of an automobile, a plurality of spaced eyes affixed to the outer side of the perimeter of said sheet, a cord disposed through said eyes and having its end portions exposed to permit drawing tightly of the edge portions of the sheet against the lower portion of the turret portion of an automobile, said sheet being provided with reinforcing tape at portions that will engage the front and rear portions of the turret type automobile body, a pair of stretchable straps extending from each longer side of said sheet, and a hook embedded in the free end portion of each of said straps.

References Cited in the file of this patent

UNITED STATES PATENTS

| 1,219,790 | Taylor | Mar. 20, 1917 |
| 1,999,171 | Bryant | Apr. 30, 1935 |
| 2,608,942 | Smith | Sept. 2, 1952 |
| 2,629,347 | Wittrien | Feb. 24, 1953 |
| 2,646,097 | Gaverth et al. | July 21, 1953 |

FOREIGN PATENTS

| 496,156 | Great Britain | Nov. 25, 1938 |